United States Patent
Li et al.

(10) Patent No.: US 10,908,037 B2
(45) Date of Patent: Feb. 2, 2021

(54) TRANSPARENT FORCE SENSING MATERIALS AND DEVICES

(71) Applicant: New Degree Technology, LLC, Baltimore, MD (US)

(72) Inventors: Hao Li, Chandler, AZ (US); Zhiyun Chen, Olney, MD (US)

(73) Assignee: New Degree Technology, LLC, Baltimore, MD (US)

( * ) Notice: Subject to any disclaimer, the term of this patent is extended or adjusted under 35 U.S.C. 154(b) by 0 days.

(21) Appl. No.: 16/002,819

(22) Filed: Jun. 7, 2018

(65) Prior Publication Data

US 2018/0356303 A1    Dec. 13, 2018

Related U.S. Application Data

(60) Provisional application No. 62/517,038, filed on Jun. 8, 2017.

(51) Int. Cl.
| | |
|---|---|
| *G01L 1/00* | (2006.01) |
| *G01L 1/18* | (2006.01) |
| *G01L 1/14* | (2006.01) |
| *G06F 3/041* | (2006.01) |
| *G06F 3/044* | (2006.01) |

(52) U.S. Cl.
CPC ............... *G01L 1/18* (2013.01); *G01L 1/146* (2013.01); *G06F 3/044* (2013.01); *G06F 3/0414* (2013.01); *B32B 2307/202* (2013.01); *B32B 2307/412* (2013.01); *G06F 2203/04105* (2013.01)

(58) Field of Classification Search
CPC ......... G01L 1/18; G01L 1/146; G06F 3/0414; G06F 3/044; G06F 2203/04105; B32B 2307/202; B32B 2307/412

USPC ......................................................... 73/862.68
See application file for complete search history.

(56) References Cited

U.S. PATENT DOCUMENTS

| | | | |
|---|---|---|---|
| 5,571,973 A | 11/1996 | Taylot | |
| 6,949,284 B2* | 9/2005 | Yoshihara | G02B 1/111 428/212 |
| 2007/0279182 A1 | 12/2007 | Kodas et al. | |
| 2009/0237374 A1* | 9/2009 | Li | G06F 3/045 345/174 |
| 2010/0046060 A1* | 2/2010 | Lee | G02F 1/19 359/277 |
| 2010/0157438 A1* | 6/2010 | Griffith | G02B 3/14 359/666 |
| 2011/0242047 A1 | 10/2011 | Kim et al. | |
| 2012/0026124 A1 | 2/2012 | Li et al. | |

(Continued)

OTHER PUBLICATIONS

International Search Report and Written Opinion to corresponding PCT/US2018/36613, dated Sep. 17, 2018. 13 pages.

(Continued)

*Primary Examiner* — Max H Noori
(74) *Attorney, Agent, or Firm* — Nixon & Vanderhye, P.C.

(57) ABSTRACT

Transparent nanocomposites may be used as force sensing materials, either as a transparent piezo-resistive material for resistive force sensing or a transparent dielectric material for capacitive force sensing. The common aspect of these nanocomposites is to engineer the refractive index of the binder to the index of the fillers so that when incorporated into a force sensor the nanocomposite films are optically transparent.

15 Claims, 3 Drawing Sheets

(56) References Cited

U.S. PATENT DOCUMENTS

| | | | |
|---|---|---|---|
| 2013/0082970 A1* | 4/2013 | Frey | G06F 3/0414 |
| | | | 345/173 |
| 2013/0150685 A1 | 6/2013 | Toth | |
| 2015/0130770 A1* | 5/2015 | Takatori | G06F 3/043 |
| | | | 345/177 |
| 2016/0277843 A1* | 9/2016 | Babayoff | H04R 17/005 |

OTHER PUBLICATIONS

International Preliminary Report on Patentability for corresponding PCT/US2018/36613, dated Dec. 10, 2019. 6 pages.

* cited by examiner

TRANSPARENT FORCE SENSING MATERIALS AND DEVICES

CROSS-REFERENCE TO RELATED APPLICATIONS

This application claims benefit of U.S. Provisional Patent Application No. 62/517,038 filed Jun. 8, 2017. It is related to PCT WO 2018/013671 filed Jul. 12, 2017; which claims priority from U.S. Provisional Patent Application Nos. 62/361,133 filed Jul. 12, 2016; 62/365,055 filed Jul. 21, 2016; and 62/367,180 filed Jul. 27, 2016. These prior applications are incorporated herein in their entirety by reference.

FIELD

This technology relates to transparent force sensing materials and force sensing devices made thereof, and more particularly to an inorganic/polymer nanocomposite material as transparent force sensing material and force sensing devices made thereof, for a variety of applications.

STATEMENT REGARDING FEDERALLY SPONSORED RESEARCH OR DEVELOPMENT

Not applicable.

BACKGROUND AND SUMMARY

In this disclosure, transparent nanocomposites that may be used as a force sensing materials are described.

BRIEF DESCRIPTION OF THE DRAWINGS

These and other features and advantages will be better and more completely understood by referring to the following detailed description of presently preferred illustrative non-limiting embodiments in conjunction with the drawings, of which.

DETAILED DESCRIPTION OF PRESENTLY PREFERRED EXAMPLE ILLUSTRATIVE NON-LIMITING EMBODIMENTS

A composite, especially a nanocomposite material comprises an inorganic filler and an organic or polymer matrix, can be used to measure local mechanical strain by detecting the change in electrical conductivity or capacitance induced by said strain. It can be used in a broad array of applications where local strain or strain change; pressure or pressure change; displacement, deformation, bending, or flexing, need to be measured.

In many applications, it is highly desirable that force sensing devices be transparent to visible light so they are invisible. This invisibility may improves the aesthetics of the device or may enable more freedom to place the force sensing devices inside an electronic device. For example, a force sensing device may be integrated with the transparent thin film transistors (TFTs) layer in a display, which may simplify the manufacturing process, improve the performance, and reduce the overall thickness of the device.

The field of use for such a transparent nanocomposite material includes but is not limited to force sensing and controls in any human machine interface for smart phones, tablets, personal computers, touch screens, virtual reality (VR) systems, gaming systems, consumer electronics, vehicles, scientific instruments, toys, remote controls, industrial machinery, bio-medical sensors to monitor heart rate, blood pressure, and the movements and acceleration of muscles, bones, joints and other body parts; robotic sensors to measure touch, local pressure, local tension, movements and acceleration of any parts of the robots; vibration sensors for buildings, bridges and any other man-made structures; sensors to monitor strain, pressure, movement, acceleration of any parts of vehicles that may be used in land, air, water, or space; movement, acceleration, and strain sensors that can be incorporated into smart fabrics; movement, acceleration, and force sensors that can be incorporated into microelectromechanical (MEMS) systems, and any other applications where local static or dynamic deformation, displacement, or strain need to be measured.

Piezo-Resistive Force Sensor

Figure 1A:
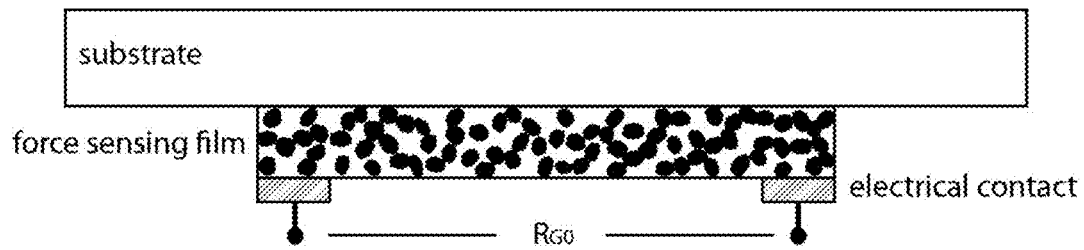
FIG. 1A shows an exemplary force sensing film comprising presently disclosed nanocomposite piezo-resistive material deposited on a substrate to form a variable resistor. Electrical contacts are made to measure the resistance of $R_{G0}$. The figure is not drawn to the real proportions for illustrative purposes and the thickness of the substrate is typically much thicker than the force sensing film so that the film lies on one side of the neutral plane and only experiences either compressive or tensile strain.
Figure 1B:
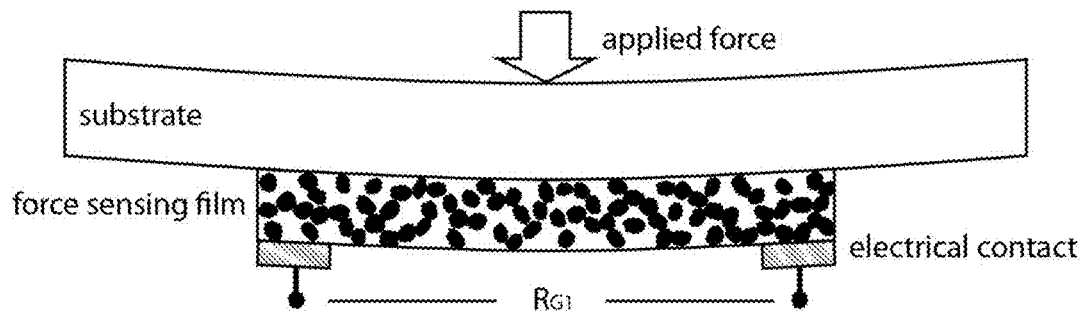
FIG. 1B shows an exemplary force sensing film comprising presently disclosed nanocomposite piezo-resistive material deposited on a substrate under an applied force. The resistance of the structure now changes to $R_{G1}$. Again the actual thickness of the substrate is much thicker than the film and in this particular case the film is experiencing tensile strain.

The presently disclosed material may be a piezo-resistive material used in a resistive strain gauge, in which the conductivity, or resistivity, changes when the material is under stress. Piezo-resistive material is widely used as force sensors. In one common form of such a force sensor, a thin strip of the piezo-resistive material deposited, or attached, or bonded, onto a substrate to form a variable resistor, as shown in FIG. 1A. Any deformation of the substrate, as shown in FIG. 1B, will induce a change of resistance of the variable resistor. By measuring the change of resistance, i.e. using a Wheatstone bridge structure shown in FIGS. 2A-2B, the local strain can be deduced. The ratio of the resistance change to the local mechanical strain is defined as Gauge Factor (GF), which can be expressed as:

$$GF = \frac{\frac{\Delta R}{R}}{\epsilon} = \frac{\frac{\Delta \rho}{\rho}}{\epsilon} + 1 + 2\upsilon \qquad \text{Eq. 1}$$

where $\epsilon$ denotes the mechanical strain; R, $\Delta R$, $\rho$, $\Delta \rho$ represent resistance, change in resistance, resistivity, and change in resistivity respectively, and $\upsilon$ is Poisson's Ratio, which is an intrinsic material property defined as the ratio between transverse strain ($e_t$) and longitudinal strain ($e_l$) in the elastic loading direction. For an isotropic, elastic, and homogeneous material, $-1 \leq \upsilon \leq 0.5$. Material with $\upsilon = 0.5$ is an incompressible material, i.e., the volume of the material does not change under mechanical strain.

It should to be noted that such a resistive force sensor does not require a piezo-resistive material to operate. In the present disclosure, a piezo-resistive material is defined as having a substantial change in resistivity when a mechanical strain is present. Although almost all materials exhibit a certain degree of piezo-resistivity, for many the effect is too small to be useful for any practical purposes and can be regarded as non-piezo-resistive. Even for a non-piezo-resistive material, i.e. $\Delta \rho = 0$, the Gauge Factor is still non-zero as the resistance still changes due to geometric change of the variable resistor under strain, given that its Poisson's Ratio of the constituent material does not equal to 0.5. In other words, a piezo-resistive effect can still be observed using a non-piezo-resistive material. This is essentially the operating mechanism of metallic wire and foil strain gauges where a metal is used the material to form the resistor. For a resistive force sensor with non-piezo-resistive material, however, the theoretical upper limit of the Gauge Factor is approximately 3 and this severely limits their usefulness in many applications.

By introducing piezo-resistive material, the sensitivity of a force sensor can be increased significantly. For example, semiconductors, such as silicon or germanium, can have a gauge factor well above 100. The gauge factor in these materials in fact is dominated by $\Delta \rho / \rho$.

The semiconductor based piezo-resistive materials, although superior in performance, require high temperature and a complex manufacturing process, and they are also brittle and fragile. They are usually available as stand alone, discreet devices with relatively high unit cost. They are difficult to be built onto flexible plastic substrates, into large array, into a variety of non-planar form factors; and placed accurately.

Composite, especially nanocomposite materials with conductive fillers and polymeric binders, can be processed similar to a polymer; they can be solution processed near room temperature, can be printed and patterned using mature film forming and printing techniques such spin-coating, spray coating, screen printing, dip-coating, slot-die printing, ink jet printing, etc. They are much more compatible with consumer electronic industry where high sensitivity, compatibility with flexible and plastic substrates, compatibility with volume production, flexibility in design and form factors, accuracy of placement, and low cost are important.

Most nanocomposite piezo-resistive materials comprise conductive fillers, such as metals, conductive metal oxides, and carbons, in a polymer matrix. The filler size is usually in the range of sub-microns to a few nanometers to ensure high dispersability of the fillers, i.e. processable viscosity property, sufficient stability, and good homogeneity.

There are two main conducting mechanisms for composite or nanocomposite piezo-resistive material: percolation and tunneling. These two mechanisms are closely related and tunneling can also be interpreted in the theoretic framework of percolation. By tuning the combination of the two mechanisms, one may achieve specific properties for different applications.

Capacitive Force Sensor

The presently disclosed material may also be a dielectric material used in a capacitive force sensor. Capacitive force sensors are currently more widely implemented in smartphones or tablets. Traditionally, the touch sensors, which only sense the location of the touch, in these devices are made of capacitive structure. Therefore, a capacitive force sensor is a natural selection for the industry as it is more compatible with the mature capacitive touch sensors.

Figure 2A:
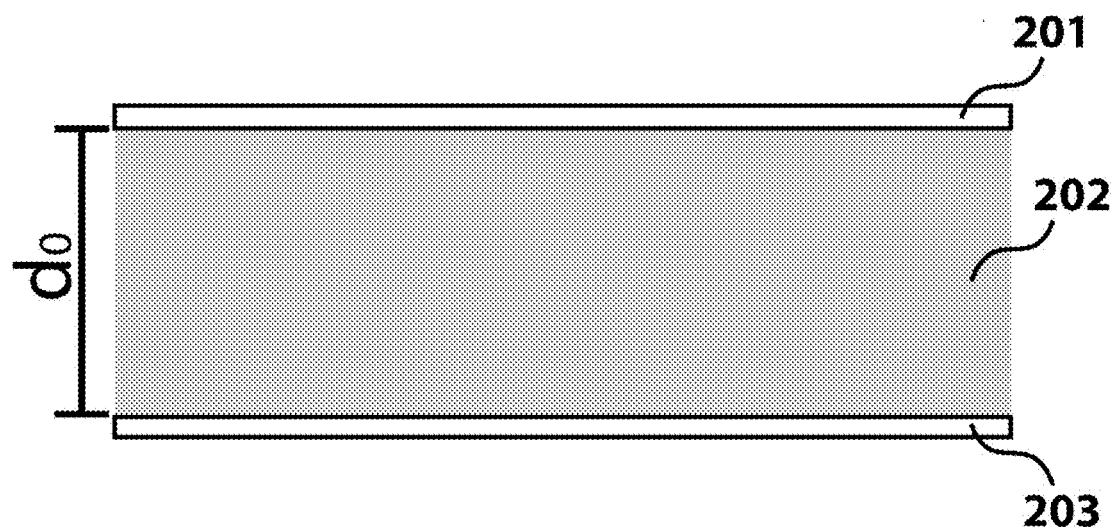
FIG. 2A shows an exemplary capacitive force sensor in its original state.
Figure 2B:
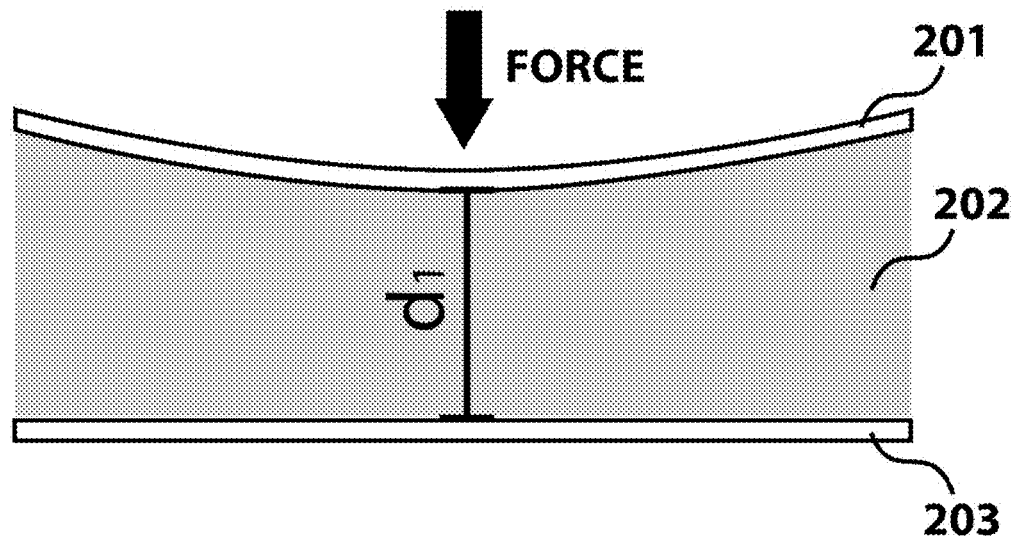
FIG. 2B shows that when an exemplary capacitive force sensor is pressed, the force changes the average distance between the two electrodes, and hence changes the capacitance.

A capacitive force sensor is basically a simple capacitor, with two parallel plate electrodes separated by an elastic dielectric layer. When pressure is applied, the elastic dielectric layer will deform and the distance between the two electrodes changes, hence the capacitance, as shown in FIGS. 2A-2B.

Capacitance of a parallel plate capacitor is expressed as:

$$C = \epsilon_o \epsilon_r \frac{A}{D} \text{ and } \frac{dC}{dD} = -\epsilon_o \epsilon_r \frac{A}{D^2},$$

where $\epsilon_0$ is the vacuum permeability, $\epsilon_r$ is the dielectric constant of the material, A is the area of the electrode, and D is the distance between the two plates. For a capacitive force sensor to have high sensitivity, a simple approach is to increase the area of the electrodes, or to reduce the separation between the two electrodes. However, for many applications, such as smartphones and tablets, to improve the location accuracy of the force touch functionality, an array of capacitors is usually implemented, and it is preferred that each capacitor has a small size. Also, if the two electrodes are too close to each other, the design may introduce an electrical short, reducing the yield, and large variation in capacitance as it becomes more difficult to manufacture.

Another approach to increase the sensitivity of the capacitive force sensor is to increase the dielectric of the material. Polymer systems are used in capacitive force sensors because polymers are easy to process and have elasticity. But polymeric materials often have low dielectric constants. Many inorganic materials have high dielectric constants, but they are usually hard and brittle and require high temperature or vacuum processes to apply as thin films. By incorporating inorganic fillers in a polymer matrix, composites with high dielectric constant, high processability, and sufficient elasticity can be produced. The dielectric constant of the composite can be described in the framework of effective medium theory, with high volume loading of the inorganic material corresponding to high dielectric constant.

Transparent Nanocomposite

Currently, there are no transparent composite materials to be used either as a piezo-resistive material or a high dielectric material for force sensing. For example, commonly used conductive fillers for piezo-resistive are metallic materials, such as carbon or silver; most of these are opaque. Barium Titanate (BTO) is a commonly used filler for high dielectric constant composites. The bulk form of BTO is not transparent in the entire visible spectrum, i.e. wavelengths in the range of 400 nm to 750 nm. Even for fillers that are transparent over the entire visible range, such as Indium Tin Oxide (ITO) as a conductive filler, or zirconia dioxide as a high dielectric constant filler, if the filler size is similar and larger than the wavelength of the light, the resulting composites are still opaque or hazy at best. For fillers in this size range, the refractive index difference between the high dielectric fillers and the polymer matrix can produce significant light scattering, i.e. Rayleigh Scattering.

There are approaches to achieve transparent composites. The first approach is to reduce the size of the inorganic fillers to be smaller than the wavelength of interest, often less than one tenth of the wavelength of the visible light, to reduce the amount of light scattering to imperceptible levels. The small size of the filler also improves the homogeneity of material, and reduces potential short circuits between the electrodes. For many materials, if the size is small enough, usually smaller than 10 nm, quantum size effect may also increase optical bandgap and render otherwise non-transparent material to be transparent in the visible spectrum. For example, bulk BTO has a bandgap of 3.2 eV, and is not transparent in the entire visible spectrum, but 7 nm sized BTO shows a bandgap of 3.5 eV due to size quantum effect, making it transparent throughout the visible range.

Another approach to achieve transparent composite is index matching. This approach further includes using a high refractive polymeric binder to match the refractive index of the transparent filler, or using low refractive index filler to match the index of the polymeric binder. If the refractive index of the polymeric binder is similar or equal to the refractive index of the filler in the visible spectrum, the resulting composite may be transparent.

Except for a few polymer systems, most common polymers have a refractive index smaller than 1.55 in the visible spectrum. A common approach to realize a high refractive index polymeric matrix is to include nano-sized high refractive index filler into a polymer matrix. The commonly used high refractive index fillers are metal oxides such as zirconium oxide, aluminum oxide, hafnium oxide, niobium pentoxide, tin oxide, indium tin oxide, zinc oxide, magnesium oxide, or cerium oxide. The filler diameter usually has to be smaller than the wavelength of interest, preferably less than one tenth of the wavelength, to avoid the haziness caused by Rayleigh scattering, and provide a highly transparent nanocomposite material. The nano-sized filler particles are usually surface engineered to include surface ligands to provide a homogeneous dispersion in the polymer matrix to minimum agglomeration of the fillers, which may reduce the transparency of the material. An example of such a highly transparent, high refractive index nanocomposite material is the PixClear™ material family manufactured by Pixelligent Technologies of Baltimore, Md.

Transparent Piezo-Resistive Material

The first exemplary illustrative non-limiting embodiment is a precursor formulation, of a transparent piezo-resistive material comprising a solvent, a conductive filler, a dispersant, and a high refractive index binder.

Said precursor formulation of a transparent piezo-resistive material for force sensing may be transparent in the visible spectrum.

Said precursor formulation of a transparent piezo-resistive material may have a transparency, measured with a spectrophotometer, larger than 40%, optionally larger than 50%, optionally larger than 60%, optionally larger than 70%, optionally larger than 80%, optionally larger than 85%, optionally larger than 90%, optionally larger than 95%, optionally larger than 99%, in the 400 nm to 750 nm wavelength range, when measured in a glass cuvette with 1 cm optical path, using another glass cuvette with a 1 cm optical path and filled with pure solvent of said precursor formulation as the reference.

Said high refractive index binder of presently disclosed film of a transparent piezo-resistive material may have a refractive index larger than 1.45, optionally larger than 1.5, optionally larger than 1.55, optionally larger than 1.6, optionally larger than 1.65, optionally larger than 1.7, optionally larger than 1.75, optionally larger than 1.8, at the wavelength of 650 nm. The refractive index may measured with a ellipsometer, a prism coupler, or any other common refractive index measurement tools on a film made of said high refractive binder with no solvent and other fillers or additives.

Said high refractive index binder of presently disclosed precursor formulation of a transparent piezo-resistive material may further comprise a high refractive index filler and a monomer, oligomer, or polymer matrix.

Said monomer, oligomer, or polymer matrix of said high refractive index binder of presently disclosed precursor formulation of a transparent piezo-resistive material may comprise at least one repeating unit of an epoxy, a carbonate, an acrylic, a fluorocarbon, an urethane, an imide, an amide, a vinyl, a silazane, a silicone, or a siloxane.

Said high refractive index binder of presently disclosed precursor formulation of a transparent piezo-resistive material may comprise a high refractive index polymer.

High refractive index binder of presently disclosed precursor formulation of a transparent piezo-resistive material may be cured by light, heat, or the combination of both.

Said high refractive index filler of said high refractive index binder of presently disclosed precursor formulation of a transparent piezo-resistive material may comprise nano-sized particles of metal oxide, such as zirconium oxide, aluminum oxide, hafnium oxide, niobium pentoxide, tin oxide, indium tin oxide, zinc oxide, magnesium oxide, cerium oxide, or any variation thereof, or any alloys thereof, or any combination thereof.

Said nano-sized particles of metal oxide may have a D99 less than 20 nm, optionally less than 10 nm, optionally less than 5 nm.

Said solvent in said precursor formulation of a transparent piezo-resistive material may comprise water or any common organic solvents, including but not limited to acetates, alcohols, alkanes, aromatics, carboxylic acids, esters, ethers, hydrocarbons, or ketones.

Said precursor formulation of a transparent piezo-resistive material may further comprise other functional ingredients such as viscosity modifier, adhesion promoter, plasticizer, photo-initiator, thermal initiator, defoamer, or cross-linker; said functional ingredients are either transparent or have very low concentration and do not significantly impact the transparency of the resulting composite.

Said conductive filler in said precursor formulation of a transparent piezo-resistive material may be transparent in the visible spectrum.

Said conductive filler in said precursor formulation of a transparent piezo-resistive material may comprise metal oxide, including but not limited to titanium dioxide, ruthenium oxide, zinc oxide, vanadium oxide, indium tin oxide, copper aluminum oxide, doped zinc oxide, indium oxide, or gallium oxide, or any variation thereof, or any alloys thereof, or any combination thereof.

Said transparent conductive filler in said precursor formulation of a transparent piezo-resistive material may comprise doped metal oxides such as indium doped tin oxide (ITO), fluorine doped tin oxide (FTO), gallium doped zinc oxide (GZO), or zinc doped tin oxide (ZTO); doped zinc oxide such as aluminum doped zinc oxide (AZO) or indium doped zinc oxide (IZO); indium-doped cadmium-oxide, barium stannate, strontium vanadate, calcium vanadate, or any variation thereof, or any alloys thereof, or any combination thereof.

Said conductive filler in said precursor formulation of a transparent piezo-resistive material may comprise a core-shell structure with an insulating core and conductive shell. This structure may be useful, for example, when both the core and shell are made of the same base material and the shell is modified to be conductive by doping.

Said conductive filler in said precursor formulation of a transparent piezo-resistive material may comprise a core-shell structure with a conductive core and a thin insulating layer serving as tunneling barrier, such silica coated ITO nanoparticles, or any conductive particles or aggregates substantially covered by organic surfactants or ligands. This geometry may provide a more controlled and stable tunneling barrier, resulting in lower noise and lower temperature dependence of Gauge Factor and resistance of the piezo-resistive material formed by said precursor formulation. This geometry may also provide better dispersability of the fillers in the precursor formulation, or the compatibility of the fillers with the polymer matrix in the piezo-resistive material formed by the precursor formulation.

Said conductive filler in said precursor formulation of a transparent piezo-resistive material may comprise conductive polymers, such as poly(thiophene)s (PT), poly(3,4-ethylenedioxythiophene) (PEDOT), poly(p-phenylene sulfide) (PPS), poly(pyrrole)s(PPY), Poly(acetylene)s(PAC), polyanilines(PANI), Poly(acetylene)s(PAC), and Poly(p-phenylene vinylene) (PPV).

Said conductive fillers in said precursor formulation of a transparent piezo-resistive material may have primary particle size smaller than 1 μm in at least one dimension, optionally smaller than 500 nm in at least one dimension, optionally smaller than 100 nm in at least one dimension, or optionally smaller than 50 nm in at least one dimension, and optionally smaller than 20 nm in at least one dimension, or optionally smaller than 10 nm in at least one dimension. The primary particle size may be measured using a transmission electron microscope (TEM), or a scanning electron microscope (SEM), or an atomic force microscope (AFM), or any appropriate techniques.

The D50 of the aggregated particle size of said conductive filler in said precursor formulation of a transparent piezo-resistive material may be smaller than 1 μm, optionally smaller than 800 nm, optionally smaller than 500 nm, optionally smaller than 400 nm, optionally smaller than 300 nm, optionally smaller than 200 nm, optionally smaller than 100 nm, and optionally smaller than 50 nm. The D50 aggregate particle size is defined as the 50th percentile in either the accumulative number distribution or accumulative volume distribution as measured by a particle size analyzer such as a Malvern Mastersizer 3000, or a Horiba LA-950 or LA-960 Laser Diffraction Particle Size Analyzer, or any similar instruments.

The D99 of the aggregated particle size of said conductive filler in said precursor formulation of a transparent piezo-resistive material may be smaller than 5 μm, optionally smaller than 3 μm, optionally smaller than 2 μm, optionally smaller than 1 μm, optionally smaller than 500 nm, optionally smaller than 400 nm, optionally smaller than 300 nm, optionally smaller than 200 nm, optionally smaller than 100 nm, optionally less than 50 nm. The D99 aggregate particle size is defined as the 99th percentile in either the accumulative number distribution or accumulative volume distribution as measured by a particle size analyzer such as a Malvern Mastersizer 3000, or a Horiba LA-950, or LA-960 Laser Diffraction Particle Size Analyzer, or any similar instruments.

The D50 of said conductive filler of said precursor formulation of a transparent piezo-resistive material may change less than 50%, optionally less than 40%, optionally less than 30%, optionally less than 20%, optionally less than 10%, optionally less than 5%, optionally less than 2%, optionally less than 1%, after 6 months stored in an air tight container at room temperature.

The primary particle size of said conductive filler in said precursor formulation of a transparent piezo-resistive material may have an average aspect ratio smaller than 50:1, optionally smaller 20:1; optionally smaller than 10:1, optionally smaller than 5.1, and optionally smaller than 3:1, and optionally smaller than 1.5:1 The aspect ratio is defined by the ratio of the largest dimension and smallest dimension of the primary particles. The aspect ratio may be measured using a TEM, an SEM, an AFM, or any appropriate techniques.

Said conductive filler in said precursor formulation of a transparent piezo-resistive material may have substantially spherical shape, potato-like shape, rice shape, polyhedral shape, oblong shape, small disc shape, small flake shape, short needle shape, bundle shape, short rod shape, tetra-pod shape, or any other common and practical shapes for nanomaterials. The shape of the filler may be measured using a TEM, an SEM, an AFM, or any appropriate techniques.

The volume ratio of said conductive filler to the high refractive index binder in said precursor formulation of a transparent piezo-resistive material may be larger than 0.1, optionally larger than 0.15, optionally larger than 0.2, optionally larger than 0.25, and optionally larger than 0.3.

Said precursor formulation of a transparent piezo-resistive material may have viscosity in the range of 0.1 centipoise to 500,000 centipoise, optionally in the range of 0.1 to 50 centipoise, optionally in the range of 50 to 500 centipoise, optionally in the range of 500 to 5000 centipoise, optionally in the range of 5,000 to 50,000 centipoise, optionally in the range of 50,000 to 500,000 centipoise, all at room temperature.

Said precursor formulation of a transparent piezo-resistive material may have a thixotropic index, defined as the ratio of viscosity between shear rate of $0.1\ s^{-1}$ and $10\ s^{-1}$ as measured by a viscometer or rheometer, below 10, optionally below 8, optionally below 5, optionally below 3, optionally below 1.1.

The viscosity of said precursor formulation of a transparent piezo-resistive material may change less than 200% change in viscosity, optionally less than 100% change in viscosity, optionally less than 50% change in viscosity, optionally less than 10% change in viscosity, after 1 month, optionally after 2 months, optionally after 6 months, stored in an air tight container at room temperature.

Transparent High Dielectric Constant Material for Force Sensing

Another exemplary illustrative non-limiting embodiment is a precursor formulation of a transparent high dielectric constant material for force sensing comprising a solvent, a high dielectric constant filler, a dispersant, and high refractive index binder.

Said precursor formulation of a transparent high dielectric constant material for force sensing may be transparent in the visible spectrum.

Said precursor formulation of a transparent high dielectric constant material for force sensing may have a transparency, measured with a spectrophotometer, larger than 40%, optionally larger than 50%, optionally larger than 60%, optionally larger than 70%, optionally larger than 80%, optionally larger than 85%, optionally larger than 90%, optionally larger than 95%, optionally larger than 99%, in the 400 nm to 750 nm wavelength range, when measured in a glass cuvette with 1 cm optical path, using another glass cuvette with a 1 cm optical path and filled with pure solvent of said precursor formulation as the reference.

Said high refractive index binder of presently disclosed film of a transparent high dielectric constant material for force sensing may have a refractive index larger than 1.45, optionally larger thanl 5, optionally larger than 1.55, optionally larger than 1.6, optionally larger than 1.65, optionally larger than 1.7, optionally larger than 1.75, optionally larger than 1.8, at the wavelength of 650 nm. The refractive index may be measured with a ellipsometer, a prism coupler, or any other common refractive index measurement tools on a film made of said high refractive binder with no solvent and other fillers or additives.

Said high refractive index binder of a presently disclosed precursor formulation of a transparent high dielectric constant material for force sensing may further comprise a high refractive index filler and a monomer, oligomer, or polymer matrix.

Said monomer, oligomer, or polymer matrix of said high refractive index binder of a presently disclosed precursor formulation of a transparent high dielectric constant material for force sensing may comprise at least one repeating unit of an epoxy, a carbonate, an acrylic, a fluorocarbon, an urethane, an imide, an amide, a vinyl, a silazane, a silicone, or a siloxane.

Said high refractive index binder of a presently disclosed precursor formulation of a transparent high dielectric constant material for force sensing may further comprise a high refractive index polymer.

Said high refractive index binder of a presently disclosed precursor formulation of a transparent high dielectric constant material for force sensing may be cured by light, heat, or the combination of both.

Said high refractive index filler of said high refractive index binder of a presently disclosed precursor formulation of a transparent high dielectric constant material for force sensing may comprise nano-sized particles of metal oxide, such as zirconium oxide, aluminum oxide, hafnium oxide, niobium pentoxide, tin oxide, indium tin oxide, zinc oxide, magnesium oxide, cerium oxide, or any variation thereof, or any alloys thereof, or any combination thereof.

Said nano-sized particles of metal oxide may have a D99 less than 20 nm, optionally less than 10 nm, optionally less than 5 nm.

Said solvent in said precursor formulation of a transparent high dielectric constant material for force sensing may comprise water or any common organic solvents, including but not limited to acetates, alcohols, alkanes, aromatics, carboxylic acids, esters, ethers, hydrocarbons, or ketones.

Said precursor formulation of a transparent high dielectric constant material for force sensing may further comprise other functional ingredients such as viscosity modifier, adhesion promoter, plasticizer, photo-initiator, thermal initiator, defoamer, or cross-linker; said functional ingredients are either transparent or have very low concentration and do not significantly impact the transparency of the resulting composite.

Said high dielectric constant filler in said precursor formulation of a transparent high dielectric constant material for force sensing may comprise metal oxide, including but not limited to silicon dioxide, aluminum oxide, zirconia oxide, hafnium oxide, titanium oxide, niobium oxide, zinc oxide, magnesium oxide, cerium oxide, tin oxide, yttrium oxide, gallium oxide, or barium titanate, or strontium titanate, or lead zirconate titanate, or any variation thereof, or any alloys thereof, or any combination thereof.

Said high dielectric constant filler in said precursor formulation of a transparent high dielectric constant material for force sensing may comprise nitrides, including but not limited to aluminum nitride, gallium nitride, boron nitride, aluminum oxynitride, or any variation thereof, or any alloys thereof, or any combination thereof.

Said high dielectric constant filler in said precursor formulation of a transparent high dielectric constant material for force sensing may comprise a core-shell structure with an inorganic core and an inorganic shell, or any filler particles or aggregates substantially covered by organic surfactants or ligands. This geometry may also provide better dispersability of the fillers in the precursor formulation, or the compatibility of the fillers with the polymer matrix in the high dielectric constant material formed by the precursor formulation.

Said high dielectric constant fillers in said precursor formulation of a transparent high dielectric constant material for force sensing may have primary particle size smaller than 1 μm in at least one dimension, optionally smaller than 500 nm in at least one dimension, optionally smaller than 100 nm in at least one dimension, optionally smaller than 50 nm in at least one dimension, optionally smaller than 20 nm in at least one dimension, optionally smaller than 10 nm in at least one dimension. The primary particle size may be measured using a TEM, an SEM, an AFM, or any appropriate techniques.

The D50 of the aggregated particle size of said high dielectric constant filler of a transparent high dielectric constant material for force sensing in said precursor formulation may be smaller than 1 μm, optionally smaller than 800 nm, optionally smaller than 500 nm, optionally smaller than 400 nm, optionally smaller than 300 nm, optionally smaller than 200 nm, optionally smaller than 100 nm, and optionally smaller than 50 nm. The D50 aggregate particle size is defined as the 50th percentile in either the accumulative number distribution or accumulative volume distribution as measured by a particle size analyzer such as a Malvern Mastersizer 3000, or a Horiba LA-950, or LA-960 Laser Diffraction Particle Size Analyzer, or any similar instruments.

The D99 of the aggregated particle size of said high dielectric constant filler in said precursor formulation of a transparent high dielectric constant material for force sensing may be smaller than 5 μm, optionally smaller than 3 μm, optionally smaller than 2 μm, optionally smaller than 1 μm, optionally smaller than 500 nm, optionally smaller than 400 nm, optionally smaller than 300 nm, optionally smaller than 200 nm, optionally smaller than 100 nm, and optionally smaller than 50 nm. The D99 aggregate particle size is defined as the 99th percentile in either the accumulative number distribution or accumulative volume distribution as measured by a particle size analyzer such as a Malvern Mastersizer 3000, or a Horiba LA-950 or LA-960 Laser Diffraction Particle Size Analyzer, or any similar instruments.

The D50 of said high dielectric constant filler of said precursor formulation of a transparent high dielectric constant material for force sensing may change less than 50%, optionally less than 40%, optionally less than 30%, optionally less than 20%, optionally less than 10%, optionally less than 5%, optionally less than 2%, optionally less than 1%, after 6 months stored in an air tight container at room temperature.

The primary particle size of said high dielectric constant filler in said precursor formulation of a transparent high dielectric constant material for force sensing may have an average aspect ratio smaller than 50:1, optionally smaller 20:1; optionally smaller than 10:1, optionally smaller than 5:1, optionally smaller than 3:1, and optionally smaller than 1.5:1 The aspect ratio is defined by the ratio of the largest dimension and smallest dimension of the primary particles. The aspect ratio may be using a TEM, an SEM, an AFM, or any appropriate techniques.

Said high dielectric constant filler in said precursor formulation of a transparent high dielectric constant material for force sensing may have substantially spherical shape, potato-like shape, rice shape, polyhedral shape, oblong shape, small disc shape, small flake shape, short needle shape, bundle shape, short rod shape, tetra-pod shape, or any other common and practical shapes for nanomaterials. The shape of the filler may be measured using a TEM, an SEM, an AFM, or any appropriate techniques.

The volume ratio of said high dielectric constant filler to the high refractive index binder in said precursor formulation of a transparent high dielectric constant material for force sensing may be larger than 0.1, optionally larger than 0.15, optionally larger than 0.2, optionally larger than 0.25, optionally larger than 0.3, optionally larger than 0.35, optionally larger than 0.4, optionally larger than 0.45, optionally larger than 0.5, optionally larger than 0.55, optionally larger than 0.6, optionally larger than 0.7, optionally larger than 0.8, optionally larger than 0.9.

Said precursor formulation of a transparent high dielectric constant material for force sensing may have viscosity in the range of 0.1 centipoise to 500,000 centipoise, optionally in the range of 0.1 to 50 centipoise, optionally in the range of 50 to 500 centipoise, optionally in the range of 500 to 5000 centipoise, optionally in the range of 5,000 to 50,000 centipoise, optionally in the range of 50,000 to 500,000 centipoise, all at room temperature.

Said precursor formulation of a transparent high dielectric constant material for force sensing may have a thixotropic index, defined as the ratio of viscosity between shear rate of $0.1\ s^{-1}$ and $10\ s^{-1}$ as measured by a viscometer or rheometer, below 10, optionally below 8, optionally below 5, optionally below 3, optionally below 1.1.

The viscosity of said precursor formulation of a transparent high dielectric constant material for force sensing may change less than a 200% change in viscosity, optionally less than a 100% change in viscosity, optionally less than a 50% change in viscosity, optionally less than a 10% change in viscosity, after 1 months, optionally after 2 months, optionally after 6 months, stored in an air tight container at room temperature.

Transparent Piezo-Resistive Film

Another exemplary illustrative non-limiting embodiment is a film of a transparent piezo-resistive nanocomposite material comprising a conductive filler, a dispersant, and a high refractive index binder, deposited onto a substrate.

Said high refractive index binder of presently disclosed film of a transparent piezo-resistive nanocomposite material may have a refractive index larger than 1.45, optionally larger than1 5, optionally larger than 1.55, optionally larger than 1.6, optionally larger than 1.65, optionally larger than 1.7, optionally larger than 1.75, optionally larger than 1.8, at the wavelength of 650 nm. The refractive index may be measured with a ellipsometer, a prism coupler, or any other common refractive index measurement tools on a film made of said high refractive binder with no other fillers or additives.

Said high refractive index binder of presently disclosed film of a transparent piezo-resistive nanocomposite material may further comprise a high refractive index filler and a monomer, oligomer, or polymer matrix.

Said monomer, oligomer, or polymer matrix of said high refractive index binder of presently disclosed film of a transparent piezo-resistive nanocomposite material may comprise at least one repeating unit of an epoxy, a carbonate, an acrylic, a fluorocarbon, an urethane, an imide, an amide, a vinyl, a silazane, a silicone, or a siloxane.

Said high refractive index binder of presently disclosed film of a transparent piezo-resistive nanocomposite material may comprise a high refractive index polymer.

Said high refractive index filler of said high refractive index binder of presently disclosed film of a transparent piezo-resistive nanocomposite material may comprise nano-sized particles of metal oxide, such as zirconium oxide, aluminum oxide, hafnium oxide, niobium pentoxide, tin oxide, indium tin oxide, zinc oxide, magnesium oxide, cerium oxide, or any variation thereof, or any alloys thereof, or any combination thereof.

Said nano-sized particles of metal oxide may have a D99 less than 20 nm, optionally less than 10 nm, optionally less than 5 nm.

Figure 3:
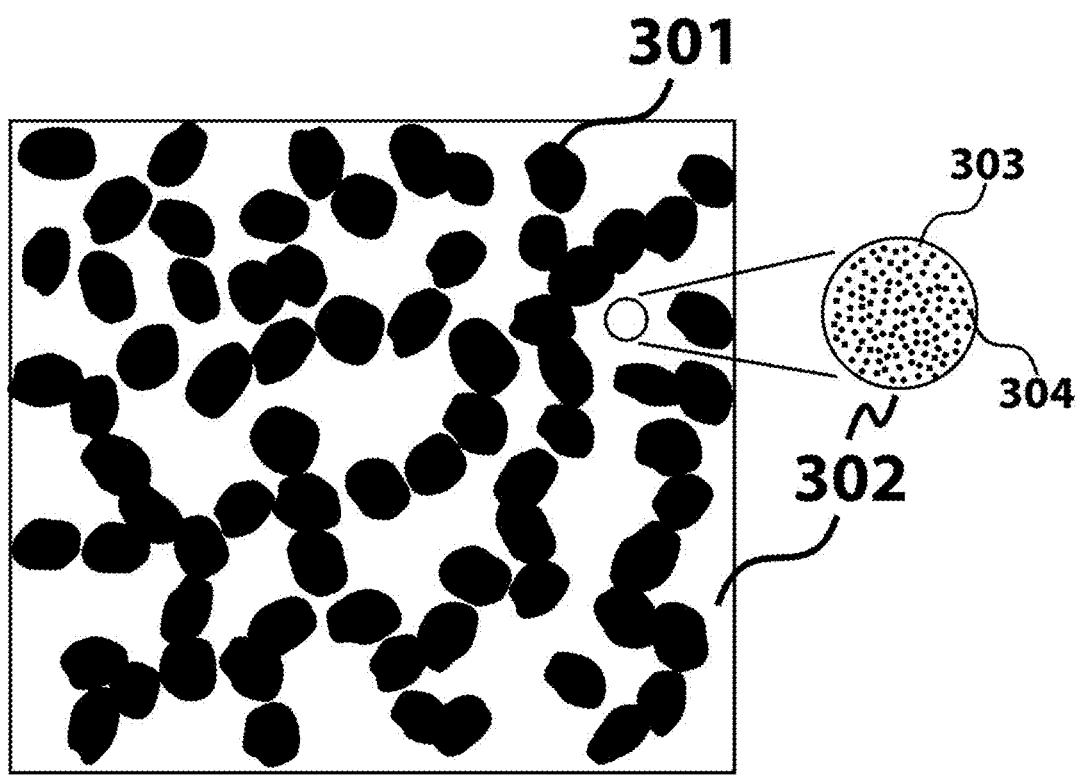
FIG. 3 shows an exemplary illustration of a transparent piezo-resistive material with a high refractive index binder made of high refractive index nanoparticle fillers and a polymer matrix.

An example of such a presently disclosed transparent piezo-resistive nanocomposite material is shown in FIG. 3, which is made of conductive filler, 301, and a high refractive index binder 302. An enlarged view of 302 further reveals the high refractive binder comprising a polymer matrix, 303, and high refractive index fillers, 304. Because the particle sizes of the high refractive index fillers are much smaller than the particle sizes of the conductive filler, the high refractive index binder can be treated as a homogeneous material when mixed with the much larger conductive fillers. A transparent high dielectric constant nanocomposite material can also be similarly illustrated.

Said substrate on which the said transparent piezo-resistive film is deposited may comprise any common substrates included but not limited to glass, quartz, semiconductor, wide bandgap semiconductor, any metal or metal alloy, plastic, printed circuit board (PCB), ceramic, paper, wood, leather, or any natural and synthetic fabrics.

The thickness of said transparent piezo-resistive film is in the range of 10 nm to 1 mm, optionally in the range of 100 nm to 50 µm, optionally in the range of 0.1 µm to 20 µm, optionally in the range of 20 µm to 50 µm, optionally in the range of 50 µm to 100 µm, optionally in the range of 100 µm to 500 µm, optionally in the range of 500 µm to 5 mm.

Said transparent piezo-resistive film may be transparent in the visible spectrum.

Said transparent piezo-resistive film may have a transparency, measured with a spectrophotometer, larger than 30%, optionally larger than 40%, optionally larger than 50%, optionally larger than 60%, optionally larger than 70%, optionally larger than 80%, optionally larger than 85%, optionally larger than 90%, optionally larger than 95%, optionally larger than 99%, in the 400 nm to 750 nm wavelength range, when measured for a 10 µm thick said piezo-resistive film deposited on a transparent substrates such as glass or quartz, using another substrate with same material, same thickness, and same surface finish as the reference.

Said transparent piezo-resistive film may have an Abbe number less than 50, optionally less than 40, optionally less than 30. If the piezo-resistive film matches both the refractive index and Abbe number of the substrates and any other coatings in the devices, it will be less visible to the un-aided eye.

Said monomer, oligomer, or polymer in said transparent piezo-resistive film may comprise common polymeric materials including but not limited to at least one repeating unit of an epoxy, a carbonate, an acrylic, a urethane, an imide, an amide, a vinyl, a silazane, a silicone, or a siloxane.

Said monomer, oligomer, or polymer in said transparent piezo-resistive film may have a bulk Poisson's Ratio smaller than 0.45, optionally smaller than 0.4, optionally smaller than 0.35, optionally smaller than 0.3, optionally smaller than 0.25, and optionally smaller than 0.2.

Said monomer, oligomer, or polymer in said transparent piezo-resistive film may be formed by curing presently disclosed precursor formulation by light, heat, or the combination of both.

Said transparent piezo-resistive film may be formed by common coating processes such as spin coating, slot die coating, draw-bar printing, doctor blade printing, stencil printing, dip coating, screen printing, or inkjet printing.

Said transparent piezo-resistive film may further comprise other functional ingredients such as viscosity modifier, dispersant, adhesion promoter, plasticizer, de-foamer, photo-initiator, thermal initiator, or cross-linker.

Said conductive filler in said transparent piezo-resistive film may be transparent in the visible spectrum.

Said transparent conductive filler in said transparent piezo-resistive film may comprise doped metal oxides such as indium doped tin oxide (ITO), fluorine doped tin oxide (FTO), gallium doped zinc oxide (GZO), or zinc doped tin oxide (ZTO); doped zinc oxide such as aluminum doped zinc oxide (AZO) or indium doped zinc oxide (IZO); indium-doped cadmium-oxide, barium stannate, strontium vanadate, calcium vanadate, or any variation thereof, or any alloys thereof, or any combination thereof.

Said conductive fillers in said transparent piezo-resistive film may comprise a core-shell structure with an insulating core and conductive shell. This structure may be useful, for example, when both the core and shell are made of the same base material and the shell is modified to be conductive by doping.

Said conductive filler in said transparent piezo-resistive film may comprise a core-shell structure with a conductive core and a thin insulating layer serving as tunneling barrier; or any conductive particles or aggregates substantially covered by organic surfactants or ligands. This geometry may also provide better compatibility of the fillers with the polymer matrix in the piezo-resistive film.

Said conductive fillers in said transparent piezo-resistive film may comprise conductive polymers, such as poly(thiophene)s (PT), poly(3,4-ethylenedioxythiophene) (PEDOT), poly(p-phenylene sulfide) (PPS), poly(pyrrole)s(PPY), Poly(acetylene)s(PAC), polyanilines(PANI), Poly(acetylene)s (PAC), or Poly(p-phenylene vinylene) (PPV).

Said conductive filler in said transparent piezo-resistive film may have primary particle size smaller than 1 µm in at least one dimension, optionally smaller than 500 nm in at least one dimension, optionally smaller than 100 nm in at least one dimension, and optionally smaller than 50 nm in at least one dimension, optionally smaller than 20 nm, and optionally smaller than 10 nm. The primary particle size may be measured using a TEM, an SEM, an AFM, or any appropriate techniques.

The D50 of the aggregated particle size of said conductive filler in said transparent piezo-resistive film may be smaller than 1 µm, optionally smaller than 800 nm, optionally smaller than 500 nm, optionally smaller than 400 nm, optionally smaller than 300 nm, optionally smaller than 200 nm, optionally smaller than 100 nm, and optionally smaller than 50 nm. The D50 of the aggregated particle size may be measured using a TEM, an SEM, an AFM, or any appropriate techniques.

The D90 of the aggregated particle size of said conductive filler in said transparent piezo-resistive film may be smaller than 5 µm, optionally smaller than 3 µm, optionally smaller than 2 µm, optionally smaller than 1 µm, optionally smaller than 500 nm, optionally smaller than 400 nm, optionally smaller than 300 nm, optionally smaller than 200 nm, optionally smaller than 100 nm, and optionally smaller than 50 nm. The D50 of the aggregated particle size may be measured using a TEM, an SEM, an AFM, or any appropriate techniques.

Said conductive filler in said transparent piezo-resistive film may have an average aspect ratio smaller than 50:1, optionally smaller than 10:1; optionally smaller than 5:1; and optionally smaller than 3:1, optionally smaller than 1.5:1 The aspect ratio is defined by the ratio of the largest dimension and smallest dimension of the primary particles. The aspect ratio may be measured using a TEM, an SEM, an AFM, or any appropriate techniques.

Said conductive filler in said transparent piezo-resistive film may have substantially spherical shape, potato-like shape, rice shape, polyhedral shape, oblong shape, small disc shape, small flake shape, short needle shape, bundle shape, short rod shape, tetra-pod shape, or any other common and practical shapes for nanomaterials. The shape of the filler may be measured using a TEM, an SEM, an AFM, or any appropriate techniques.

Said conductive filler in said transparent piezo-resistive film may have loading level near or above the percolation threshold for a matrix. Said conductive filler has loading level higher than 5% by volume in said nanocomposite material, optionally higher than 10% by volume in said nanocomposite, optionally having loading level higher than 11% by volume in said nanocomposite material, optionally having loading level higher than 12% by volume in said nanocomposite material, optionally having loading level higher than 13% by volume in said nanocomposite material, optionally having loading level higher than 14% by volume in said nanocompo site material, optionally having loading level higher than 15% by volume in said nanocomposite material, optionally having loading level higher than 16% by volume in said nanocomposite material, optionally having loading level higher than 17% by volume in said nanocomposite material, optionally having loading level higher than 18% by volume in said nanocomposite material, optionally having loading level higher than 19% by volume in said nanocomposite material, optionally having loading level higher than 20% by volume in said nanocomposite material, optionally having loading level higher than 25% by volume in said nanocomposite material, optionally having loading level higher than 30% by volume in said nanocomposite material.

Said transparent piezo-resistive film may have a resistivity, at room temperature, in the range of 0.001 to 0.1 Ω-cm, optionally in the range of 0.1 to 10 Ω-cm, optionally in the range of 10 to 1000 Ω-cm, optionally in the range of 1000 to 100,000 Ω-cm. The resistivity may be measured using a common Multimeter, such as an Agilent 34401A digital Multimeter. The films may be patterned into known geometry with proper electrical contacts and the resistance may be measured using either a standard two wire or four wire configuration and the resistivity can be calculated from the measured resistance.

Said transparent piezo-resistive film may have a GF greater than 1, optionally greater than 5, optionally greater than 10, optionally greater than 15, and optionally greater than 20, under tensile strain. The gauge factor may be measured with ASTM E251 or similar methods.

Said transparent piezo-resistive film may have a GF greater than 1, optionally greater than 5, optionally greater than 10, optionally greater than 15, and optionally greater than 20, under compressive strain. The GF may be measured with ASTM E251 or similar methods.

Said piezo-resistive film may have a temperature coefficient of resistance (TCR) less than 10,000 ppm, optionally less than 5,000 ppm, optionally less than 1,000 ppm, optionally less than 500 ppm, optionally less than 100 ppm, and optionally less than 50 ppm. TCR is defined as |R50−R20|/R20/30, where R50 and R20 are the resistance of the test resistor at 50° C. and 20° C. respectively.

Transparent High Dielectric Constant Film for Force Sensing

Another exemplary illustrative non-limiting embodiment is a film of a transparent high dielectric constant nanocomposite material for force sensing comprising a high dielectric constant filler, a dispersant, and a high refractive index binder, deposited onto a substrate.

Said high refractive index binder of a presently disclosed film of a transparent high dielectric constant nanocomposite material for force sensing may have a refractive index larger than 1.45, optionally larger than 1.5, optionally larger than 1.55, optionally larger than 1.6, optionally larger than 1.65, optionally larger than 1.7, optionally larger than 1.75, optionally larger than 1.8, at the wavelength of 650 nm. The refractive index may be measured with a ellipsometer, a prism coupler, or any other common refractive index measurement tools on a film made of said high refractive binder with no other fillers or additives.

Said high refractive index binder of presently disclosed film of a transparent high dielectric constant nanocomposite material for force sensing may further comprise a high refractive index filler and a monomer, oligomer, or polymer matrix.

Said monomer, oligomer, or polymer matrix of said high refractive index binder of presently disclosed film of a transparent high dielectric constant nanocomposite material for force sensing may comprise at least one repeating unit of an epoxy, a carbonate, an acrylic, a fluorocarbon, an urethane, an imide, an amide, a vinyl, a silazane, a silicone, or a siloxane.

Said high refractive index binder of presently disclosed film of a transparent high dielectric constant nanocomposite material for force sensing may comprise a high refractive index polymer.

Said high refractive index filler of said high refractive index binder of presently disclosed film of a transparent high dielectric constant nanocomposite material for force sensing may comprise nano-sized particles of metal oxide, such as zirconium oxide, aluminum oxide, hafnium oxide, niobium pentoxide, tin oxide, indium tin oxide, zinc oxide, magnesium oxide, cerium oxide, or any variation thereof, or any alloys thereof, or any combination thereof.

Said nano-sized particles of metal oxide may have a D99 less than 20 nm, optionally less than 10 nm, optionally less than 5 nm.

Said substrate on which the said film of transparent high dielectric constant nanocomposite is deposited may comprise any common substrates include by not limited to glass, quartz, semiconductor, wide bandgap semiconductor, any metal or metal alloy, plastic, printed circuit board (PCB), ceramic, paper, wood, leather, or any natural and synthetic fabrics.

The thickness of said film of transparent high dielectric constant nanocomposite is in the range of 10 nm to 1 mm, optionally in the range of 100 nm to 50 μm, optionally in the range of 0.1 μm to 20 μm, optionally in the range of 20 μm to 50 μm, optionally in the range of 50 μm to 100 μm, optionally in the range of 100 μm to 500 μm, and optionally in the range of 500 μm to 5 mm.

Said film of transparent high dielectric constant nanocomposite may be transparent in the visible spectrum.

Said film of transparent high dielectric constant nanocomposite may have a transparency, measured with a spectrophotometer, larger than 30%, optionally larger than 40%, optionally larger than 50%, optionally larger than 60%, optionally larger than 70%, optionally larger than 80%, optionally larger than 85%, optionally larger than 90%, optionally larger than 95%, optionally larger than 99%, in the 400 nm to 750 nm wavelength range, when measured for a 10 μm thick high dielectric constant film deposited on a transparent substrate such as glass or quartz, using another substrate with same material, same thickness, and same surface finish as the reference.

Said film of transparent high dielectric constant nanocomposite may have an Abbe number less than 50, optionally less than 40, optionally less than 30. If the high dielectric constant film matches both the refractive index and Abbe number of the substrates and any other coatings in the devices, it will be less visible to the un-aided eye.

Said monomer, oligomer, or polymer in said film of transparent high dielectric constant nanocomposite may comprise common polymeric materials including but not limited to at least one repeating unit of an epoxy, a carbonate, an acrylic, a urethane, an imide, an amide, a vinyl, a silazane, a silicone, or a siloxane.

Said monomer, oligomer, or polymer in said film of transparent high dielectric constant nanocomposite may be formed by curing presently disclosed precursor formulation by light, heat, or the combination of both.

Said film of transparent high dielectric constant nanocomposite may be formed by common coating processes such as spin coating, slot die coating, draw-bar printing, doctor blade printing, stencil printing, dip coating, screen printing, or inkjet printing.

Said film of transparent high dielectric constant nanocomposite may further comprise other functional ingredients such as viscosity modifier, dispersant, adhesion promoter, plasticizer, de-foamer, photo-initiator, thermal initiator, or cross-linker, Said high dielectric constant filler in said film of transparent high dielectric constant nanocomposite may be transparent in the visible spectrum.

Said high dielectric constant filler in said film of high dielectric constant nanocomposite may comprise metal oxide, including but not limited to titanium dioxide, ruthenium oxide, zinc oxide, vanadium oxide, indium tin oxide, copper aluminum oxide, doped zinc oxide, indium oxide, or gallium oxide, or barium titanate, or strontium titanate, or lead zirconate titanate, or any variation thereof, or any alloys thereof, or any combination thereof.

Said high dielectric constant filler in said transparent film of high dielectric constant nanocomposite film may comprise a core-shell structure with a conductive core and a thin insulating layer serving as tunneling barrier; or any conductive particles or aggregates substantially covered by organic surfactants or ligands. This geometry may also provide better compatibility of the fillers with the polymer matrix in the high dielectric film.

Said high dielectric constant filler in said film of transparent high dielectric constant nanocomposite film may have primary particle size smaller than 1 μm in at least one dimension, optionally smaller than 500 nm in at least one dimension, optionally smaller than 100 nm in at least one dimension, optionally smaller than 50 nm in at least one dimension, optionally smaller than 20 nm in at least one dimension, and optionally smaller than 10 nm in at least one dimension. The primary particle size may be measured using a TEM, an SEM, an AFM, or any appropriate techniques.

The D50 of the aggregated particle size of said transparent high dielectric constant filler in said film of high dielectric constant nanocomposite film may be smaller than 1 μm, optionally smaller than 800 nm, optionally smaller than 500 nm, optionally smaller than 400 nm, optionally smaller than 300 nm, optionally smaller than 200 nm, optionally smaller than 100 nm, and optionally smaller than 50 nm. The D50 of the aggregated particle size may be measured using a TEM, an SEM, an AFM, or any appropriate techniques.

The D90 of the aggregated particle size of said transparent high dielectric constant filler in said film of high dielectric constant nanocomposite may be smaller than 5 μm, optionally smaller than 3 μm, optionally smaller than 2 μm, optionally smaller than 1 μm, optionally smaller than 500 nm, optionally smaller than 400 nm, optionally smaller than 300 nm, optionally smaller than 200 nm, optionally smaller than 100 nm, and optionally smaller 50 nm. The D50 of the aggregated particle size may be measured using a TEM, an SEM, an AFM, or any appropriate techniques.

Said high dielectric constant filler in said film of transparent high dielectric constant nanocomposite may have an average aspect ratio smaller than 50:1, optionally smaller than 10:1; optionally smaller than 5:1; optionally smaller than 3:1; and optionally smaller than 1.5:1 The aspect ratio is defined by the ratio of the largest dimension and smallest dimension of the primary particles. The aspect ratio may be measured using a TEM, an SEM, an AFM, or any appropriate techniques.

Said high dielectric constant filler in said film of transparent high dielectric constant nanocomposite film may have substantially spherical shape, potato-like shape, rice shape, polyhedral shape, oblong shape, small disc shape, small flake shape, short needle shape, bundle shape, short rod shape, tetra-pod shape, or any other common and practical shapes for nanomaterials. The shape of the filler may be measured using a TEM, an SEM, an AFM, or any appropriate techniques.

Said high dielectric constant filler in said film of transparent high dielectric constant nanocomposite film may have loading level higher than 1% by volume in said nanocomposite material, optionally higher than 5% by volume in said nanocomposite material, optionally higher than 10% by volume in said nanocomposite material, optionally higher than 15% by volume in said nanocomposite material, optionally higher than 20% by volume in said nanocomposite material, optionally higher than 25% by volume in said nanocomposite material, optionally higher than 30% by volume in said nanocomposite material, optionally higher than 35% by volume in said nanocomposite material, optionally higher than 40% by volume in said nanocomposite material, optionally higher than 45% by volume in said nanocomposite material, optionally higher than 50% by volume in said nanocomposite material, optionally higher than 60% by volume in said nanocomposite material, optionally higher than 70% by volume in said nanocomposite material, optionally higher than 80% by volume in said nanocomposite material, and optionally higher than 60% by volume in said nanocomposite material.

Said high dielectric constant filler in said film of transparent high dielectric constant nanocomposite film may have a dielectric higher than 2, optionally higher than 5, optionally higher than 8, and optionally higher than 10.

Transparent Resistive Force Sensor

Another exemplary illustrative non-limiting embodiment is a resistive force sensor comprising at least one variable resistor at least partially comprising the presently disclosed transparent piezo-electric film built on a substrate.

Said substrate of the transparent resistive force sensor may include the force accepting surface. Said resistive force sensor may be further attached to a structure which includes the force accepting surface. Said attaching may include clamping, gluing, or bonding.

Said resistive tactile or force sensor may be used in applications described in paragraph [0006].

Another exemplary illustrative non-limiting embodiment is a capacitive force sensor at least partially comprising the presently disclosed high dielectric constant film.

Said substrate of the transparent capacitive force sensor may include the force accepting surface. Said capacitive force sensor may be further attached to a structure which includes the force accepting surface. Said attaching may include clamping, gluing, or bonding.

Said capacitive tactile or force sensor may be used in applications described in paragraph [0006].

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A transparent piezo-resistive film structure for use on a substrate, the film structure exhibiting a change in resistivity in response to mechanical strain, the film structure comprising:
    a substrate including a force accepting surface, and
    a piezo-resistive film mechanically coupled to the substrate, the piezo-resistive film changing resistivity in response to mechanical strain applied to the substrate force accepting surface, the piezo-resistive film comprising:
        a transparent conductive material having a first refractive index, and
        a high refractive index binder having a second refractive index, the high refractive index binder comprising at least one nano-sized metal oxide filler and a monomer, oligomer, or polymer matrix,
    wherein the first refractive index matches the second refractive index, and
    wherein said monomer, oligomer, or polymer matrix comprises at least one of an epoxy, a carbonate, an acrylic, a urethane, an imide, an amide, a vinyl, a silazane, a silicone, and a siloxane.

2. The transparent piezo-resistive film structure of claim 1 having transparency larger than 40% in a wavelength range of 400 nm to 750 nm.

3. The transparent piezo-resistive film structure of claim 1 wherein the second refractive index is larger than 1.6 at a wavelength of 650 nm.

4. The transparent piezo-resistive film structure of claim 1 wherein said transparent conductive material has a loading less than 30% by volume.

5. The transparent piezo-resistive film structure of claim 1 wherein said transparent conductive material has a size less than 1μm in at least one dimension.

6. The transparent piezo-resistive film structure of claim 1 wherein said transparent conductive material comprises at least one of indium doped tin oxide, fluorine doped tin oxide, gallium doped zinc oxide, zinc doped tin oxide, aluminum doped zinc oxide, indium doped zinc oxide (IZO), indium-doped cadmium-oxide, barium stannate, strontium vanadate, and calcium vanadate.

7. The transparent piezo-resistive film structure of claim 1 wherein said transparent conductive material comprises at least one of poly(thiophene)s (PT), poly (3,4-ethylenedioxythiophene) (PEDOT), poly(p-phenylene sulfide) (PPS), poly(pyrrole)s(PPY), Poly(acetylene)s(PAC), polyanilines (PANI), Poly(acetylene)s(PAC), and Poly(p-phenylenevinylene) (PPV).

8. The transparent piezo-resistive film structure of claim 1 wherein the resistivity of said film ranges from 0.1 Ω-cm to 10 Ω-cm at room temperature.

9. The transparent piezo-resistive film structure of claim 1 wherein the gauge factor of said film is larger than 5 under compressive strain.

10. The transparent piezo-resistive film structure of claim 5 wherein the gauge factor of said film is larger than 5 under tensile strain.

11. The transparent piezo-resistive film structure of claim 5 wherein the substrate comprises glass, quartz, semiconductor, wide bandgap semiconductor, any metal or metal alloy, plastic, PCB, ceramic, paper, wood, leather, or any natural and synthetic fabrics.

12. A resistive force sensor comprising at least one variable resistor, the at least one variable resistor comprising a transparent piezo-resistive film for use on a substrate, the film exhibiting a change in resistivity in response to mechanical strain, the sensor comprising:
  a substrate including a force accepting surface; and
  a piezo-resistive film mechanically coupled to the substrate, the film exhibiting a change in resistivity in response to mechanical force applied to the substrate force accepting surface, the film comprising:
    a transparent conductive material having a first refractive index, and
    a high refractive index binder having a second refractive index, the high refractive index binder comprising a high refractive index filler,
  wherein the first refractive index matches the second refractive index,
  wherein the transparent conductive material comprises a primary particle, and the high refractive index binder comprises a monomer, oligomer, or polymer matrix, a refractive index of the primary particle matching a refractive index of the monomer, oligomer, or polymer matrix.

13. A transparent piezo-resistive film structure exhibiting a change in resistivity in response to applied mechanical strain, the film structure comprising:
  a force-accepting structure that accepts force; and
  a variable-resistive film mechanically coupled to the force accepting structure, the variable-resistive film changing resistance in response to the amount of force applied to the force-accepting structure, the variable-resistive film comprising:
    a transparent conductive material having a first refractive index and comprising a primary particle having a refractive index matching a refractive index of a monomer, oligomer, or polymer matrix, and
    a high refractive index binder comprising the monomer, oligomer, or polymer matrix and including a high refractive index filler, wherein the high refractive index binder has a second refractive index that matches the first refractive index.

14. The transparent piezo-resistive film structure of claim 1 wherein the conductive material is transparent in the visible spectrum.

15. The transparent piezo-resistive film structure of claim 1 wherein the first refractive index is equal to the second refractive index.

* * * * *